April 27, 1926.
C. REGGIO
SYRINGE
Filed May 2, 1924
1,582,690
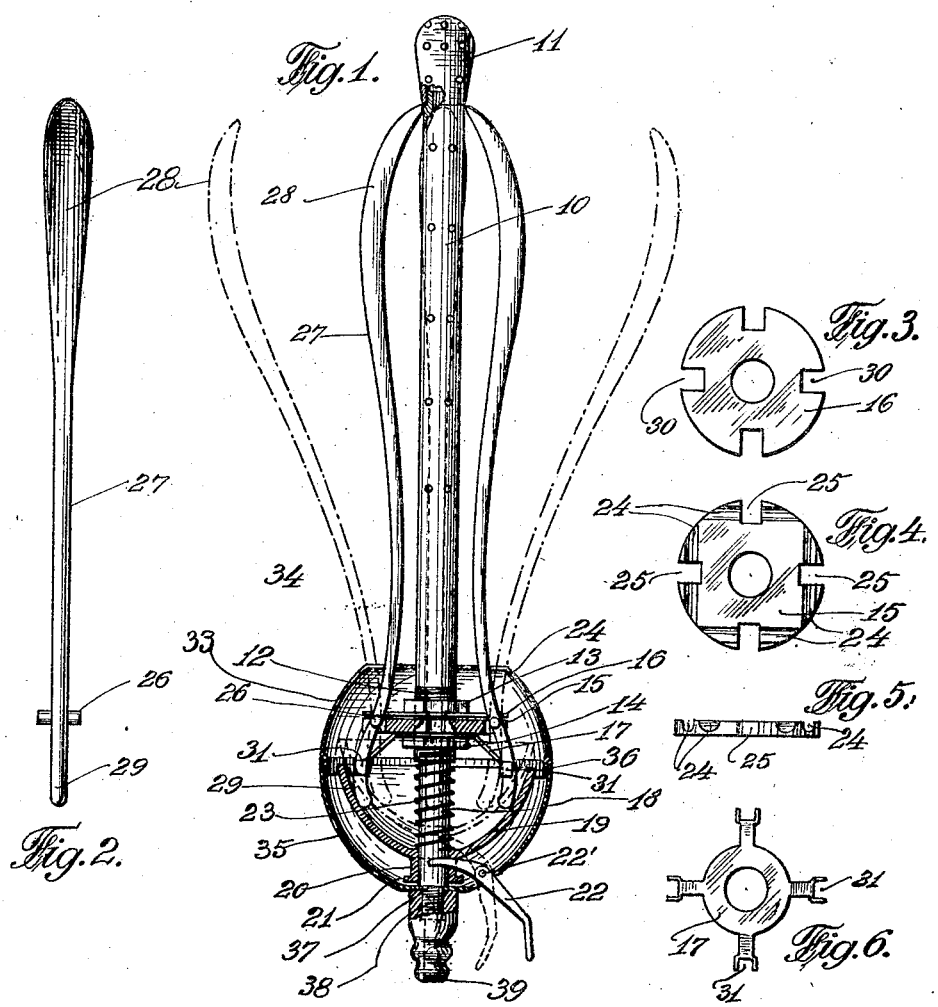
INVENTOR
Christy Reggio
BY
ATTORNEY Patented Apr. 27, 1926.

1,582,690

UNITED STATES PATENT OFFICE.

CHRISTY REGGIO, OF BROOKLYN, NEW YORK, ASSIGNOR TO MILDRED REGGIO, OF BELLAIR, NEW YORK.

SYRINGE.

Application filed May 2, 1924. Serial No. 710,601.

*To all whom it may concern:*

Be it known that I, CHRISTY REGGIO, a citizen of the United States, and resident of New York, in the county of Kings and State of New York, have invented certain new and useful Improvements in Syringes, of which the following is a specification.

This invention relates to syringes in general and particularly the kind provided with dilating apparatus for widening a cavity to be irrigated and it particularly relates to syringes for irrigating and disinfecting the vaginal cavity.

Vaginal syringes are generally known and in use, but a great number of them do not successfully perform the duty for which they are designed, since they do not reach and do not thoroughly cleanse the interior of the cavity, which is of a peculiar structure, comprising a plurality of folded tissues or membranes which cannot be successfully reached by dilating them in certain portions of the cavity only, but which have to be unfolded over their entire length in order to be properly affected by irrigation or disinfection.

Furthermore, a vaginal syringe is only then effective if its dilating apparatus not only spreads the folded tissues over the entire length of the walls, but also keeps the same spread during the irrigation period and also keeps the constricted entrance of the organ spread in such a way as to permit the free exit of the irrigating fluid.

A very important point to be borne in mind is that all mechanism of the dilating apparatus is to be kept wholly without the organ to be irrigated and so arranged that it by no means can injure the delicate tissue of either the insides or the orifice of the organ.

The prime object of this invention is to provide a device of this kind which will thoroughly fulfill the aforesaid conditions and which will effectually operate without injury to the organ and which will permit its use by each individual without danger, and which will also readily permit a thorough cleansing of the parts.

Another object of this invention is to provide a syringe in which the dilating apparatus may be adjusted relative to the nozzle or spray, by means of which adjustment, the particular portions of the organ may be dilated to a greater or smaller extent as desired.

Another object of my invention is to provide means for completely enclosing the operating parts, thus precluding contact of these parts with the organ.

The foregoing and still further objects will be more fully apparent from the following description and the accompanying drawings, forming part of this disclosure and showing a typical, but by no means final design of my device.

Referring to the drawings,

Figure 1 is a partial cross-sectional view through my apparatus.

Figure 2 is an elevation of a dilator finger.

Figure 3 represents the top portion of the dilator holder or carrier.

Figure 4 is a top view of the dilator carrier.

Figure 5 is a side elevation thereof.

Figure 6 is a spreader for the holders.

In the figures, numeral 10 denotes a tubular partially perforated member which is equipped at its upper end with a globular or pear-shaped detachable or exchangeable nozzle 11, which is also perforated.

At the lower end, the tubular member is provided with a thread indicated at 12, said thread adapted to be engaged by two nuts 13 and 14, which serve the purpose of holding together the carrier 15, the carrier plate 16 and the spreader 17.

The carrier with the spreader and the plate 16 are adjustable relative to the tubular member 10. Below the threaded portion 12 of tubular member 10, the latter is reduced as indicated at 18. This portion is smooth and is adapted to serve as guide for a generally cup-shaped or semi-spherical operating member 19; the latter is provided with a collar 20, and a flange 21, the collar being engaged by bifurcated actuating member 22.

Between the offset of the threaded portion 12 and the operating member 19, there is provided an expansion spring 23, which keeps the operating member 19, and thus the actuating member 22 in downward position.

The carrier 15 represents a heavy plate provided with semi-cylindrical recesses 24 and cut-outs 25, cross-secting these recesses.

The semi-cylindrical recesses 24 are adapted to receive pins 26 of the dilator fingers 27. These pins 26 divide the fingers into an unequal armed lever, the upper portion 28 of which, being longer than the lower portion 29. The pins 26 provide pivots for the dilators and are held in place by plate 16 which is also provided with cut-outs 30 corresponding to the cut-outs 25 of carrier 15.

These cut-outs permit a free movement of the dilators while swinging about the pivots 26. The lower and shorter arms 29 of the dilators are engaged by the U-shaped springs 31 of the spreader 17, which spreader normally holds the upper portions 28 of the dilators, adjacent or in close relation to tubular member 10.

As will be seen, the lower portions 29 of the dilators are rounded and are engaged by the cup-shaped operating member 19. The entire operating mechanism including the adjustable carrier, spreader, the operating cup 19 and the portion of the actuating member 22, is enclosed in a spherical closure 32 consisting of an upper part 33, which is provided with slots 34 for permitting the free movement of the upper portions of dilators 27 and a lower half 35, which is conveniently attached to the upper portion, by means of a recessed threaded band indicated at 36, or may be held together in any other suitable way.

The lower portion 35, on the other hand, is firmly associated with tubular member 11 recessed at 37, which recessed portion continues and is threaded at 38 and is adapted to receive a tip 39, which, when firmly fastened will clamp tight the lower portion of the closure.

By adjusting the carrier relative to tubular member 10, the position of the dilators relative to the tubular member and particularly to the nozzle 11, is changed. Thus, when it is desired to spread a portion of the tissue at or very near the nozzle, the carrier is adjusted in upward direction, thereby shifting the dilators upwards, thus assuring the spreading of that portion of the organ which is nearest the nozzle.

In some cases, it is desirable to have the dilators extend above the nozzle. Such an adjustment may be readily made in my device, in which case, however, the upper portion 33 of the closure becomes somewhat longer and the thread 12 extends further up than shown.

For the sake of clarity, these features are not shown in the drawings, since they are obvious.

The operation of my device is extremely simple and safe. The upper portion is inserted into the vaginal cavity and when sufficiently induced thereinto, the spreading of the dilators is accomplished by pressing actuating lever 22 towards the tubular member.

It is obvious that to the tip 39, a flexible hose is attached, which conveys the medicated liquid into the tubular member 10. The position of the dilators, when spread, is indicated in broken lines and also the position of the operating member 19, and the actuating member 22 is shown in the same manner.

It will be seen that by pressing lever 22, which is hinged at 22' of the lower portion of the housing, the operating member 19 is pushed upwards and causes the shorter arms of the dilators to draw towards each other, whereby the upper portion of the dilators are spread. The degree of spread may be readily regulated to a very fine degree by the amount of pressure exerted upon lever 22.

Through the drawing together of the shorter lever portions of the dilators, the springs of spreader 17 are compressed and the moment lever 22 is released, expansion spring 23 causes operating member 19 to assume its normal downward position and the spreader causes the shorter lever arms of the dilator to spread, thus closing the upper lever arms, keeping them in adjacent relation to tubular member 10.

Due to the fact that none of the operating mechanism touches the organ to be irrigated, the danger of injuring the delicate walls and tissues of the organ is eliminated.

The closure gives a purchase to the user, preventing slippage or misplacement, thereby affording a great deal of safety in operation.

While I have shown a particular construction of my device, and while in the drawings, the dilators are shown to be quite distanced from the tubular member 10, it is obvious that the curvature and the shape of the dilators may be altered to suit various conditions and also the construction may be altered so as to provide for simple and safe operation and inexpensive manufacture.

From the foregoing, it is evident that I shall not be limited to the showing and I reserve for myself the right to make such changes and improvements required, due to the various applications of my device and use.

Having thus described my invention, I claim:

1. A syringe, comprising a partially perforated tubular member having a perforated detachable globular end, a dilator carried adjustably associated with said tubular member, a plurality of dilators pivotally connected with said carrier, a resilient spreader engaging the shorter arms of the dilators for normally holding the longer arms of said dilators adjacent to said tubular member, cup-shaped dilator operating means adapted to engage the shorter arms of the dilators, actuating means engaging said operating means, a generally globular closure adapted to cover the lower portions of the dilators, the carrier, said operating means and portion of said actuating means and further adapted to be wholly without the organ to be irrigated.

2. A syringe, comprising a partially perforated tubular member, having a perforated detachable globular end, the other end of said tubular member adapted to receive an adjustable dilator carrier, a carrier comprising a dilator supporting member and a dilator fastening member, a plurality of dilators having pivots extending sidewise from said dilators and adapted to be securely held between the two carrier members, said pivots dividing said dilators into unequal armed elements, a resilient spreader engaging the shorter arms of said dilators and adapted to normally hold the longer arms of said dilators adjacent to said tubular member, means for facilitating adjustment of said carrier and said spreader relative to said tubular member, operating means for said dilators engaging the shorter arms, actuating means engaging said operating means and a closure for the lower dilator portions, said carrier, said spreader, said operating means and a portion of said actuating means.

3. A syringe, as per claim 2, said dilator operating means comprising a semi-spherical hollow member engaging and glidably mounted with the lower portion of said tubular member and having a collar forming an integral part of said hollow member, said actuating means adapted to engage said collar.

4. A syringe, as per claim 2, said dilator operating means comprising a hollow cup-shaped, semi-spherical member adapted to receive and engage with its inner surface the shorter arms of said dilators and glidably mounted upon the lower portion of said tubular member, and spring means for normally holding said operating means distanced from said carrier, a collar extending from and forming an integral part of said semi-spherical member, said actuating means adapted to engage said collar.

5. A syringe, comprising a partially perforated tubular member, having a perforated globular and removable end nozzle, the other end of said tubular member provided with means for receiving a dilator carrier, a dilator carrier adjustably associated with said tubular member, a resilient spreader adjustably inserted upon the tubular member, a plurality of unequal armed dilators provided with pivots engaged by said carrier, their shorter arms engaged by said spreader and pressed outwardly thereby forcing the longer arms of said dilators toward said tubular member, a spring controlled, generally cup-shaped operating member having a collar extension and engaging with its inner face the shorter arms of said dilators and adapted to press said shorter arms together when operated, thus spreading the longer arms of said dilators, fork-shaped means for engaging said collar extension and actuating said operating member, a closure for the entire lower portion of the syringe, and a tip associated with the lower end of said tubular member for holding said closure and for facilitating connection with a supply hose.

Signed at New York in the county of New York and State of New York, this 21st day of April, A. D. 1924.

CHRISTY REGGIO.